United States Patent [19]

Lehmann et al.

[11] 3,919,753

[45] Nov. 18, 1975

[54] ROLL

[75] Inventors: Rolf Lehmann, Mutschellen Aargau; Helmuth Lehmann, Zurich, both of Switzerland

[73] Assignee: Escher Wyss Limited, Zurich, Switzerland

[22] Filed: Nov. 5, 1974

[21] Appl. No.: 520,979

[30] Foreign Application Priority Data
Nov. 22, 1973   Switzerland...................... 16495/73

[52] U.S. Cl............................................ 29/113 AD
[51] Int. Cl.²......................................... B21B 31/32
[58] Field of Search ..... 29/116 AD;113 AD, 113 R, 29/110, 129.5

[56]   References Cited
UNITED STATES PATENTS

| | | | |
|---|---|---|---|
| 3,146,160 | 8/1964 | Kankaanpaa............... | 29/113 AD X |
| 3,224,698 | 12/1965 | Conti............................ | 29/113 R X |
| 3,618,190 | 11/1971 | Vernazza et al. .............. | 29/116 AD |
| 3,703,862 | 11/1972 | Appenzeller............... | 29/113 AD X |
| 3,802,044 | 4/1974 | Spillmann et al.............. | 29/113 AD |
| 3,846,883 | 11/1974 | Biondetti....................... | 29/116 AD |

*Primary Examiner*—Alfred R. Guest
*Attorney, Agent, or Firm*—Pennie & Edmonds

[57]   ABSTRACT

A controlled deflection roll includes a generally cylindrical core supported at its ends in bearings for driven rotation, a roll shell surrounding the core with radial clearance between the two, means coupling the shell to the core to rotate therewith, a plurality of hydraulically actuated shell-supporting elements disposed between the shell and core and hydrostatically lubricated to each, and a sleeve coupled to one of the core bearings, i.e., to the stationary supporting frame for the core, to carry the shell-supporting elements in a fixed row or rows parallel to the axis of the core. The shell-supporting elements may include oppositely working pistons in a common cylinder formed in or carried by the sleeve, or one piston working in a cylinder formed in the other piston.

8 Claims, 6 Drawing Figures

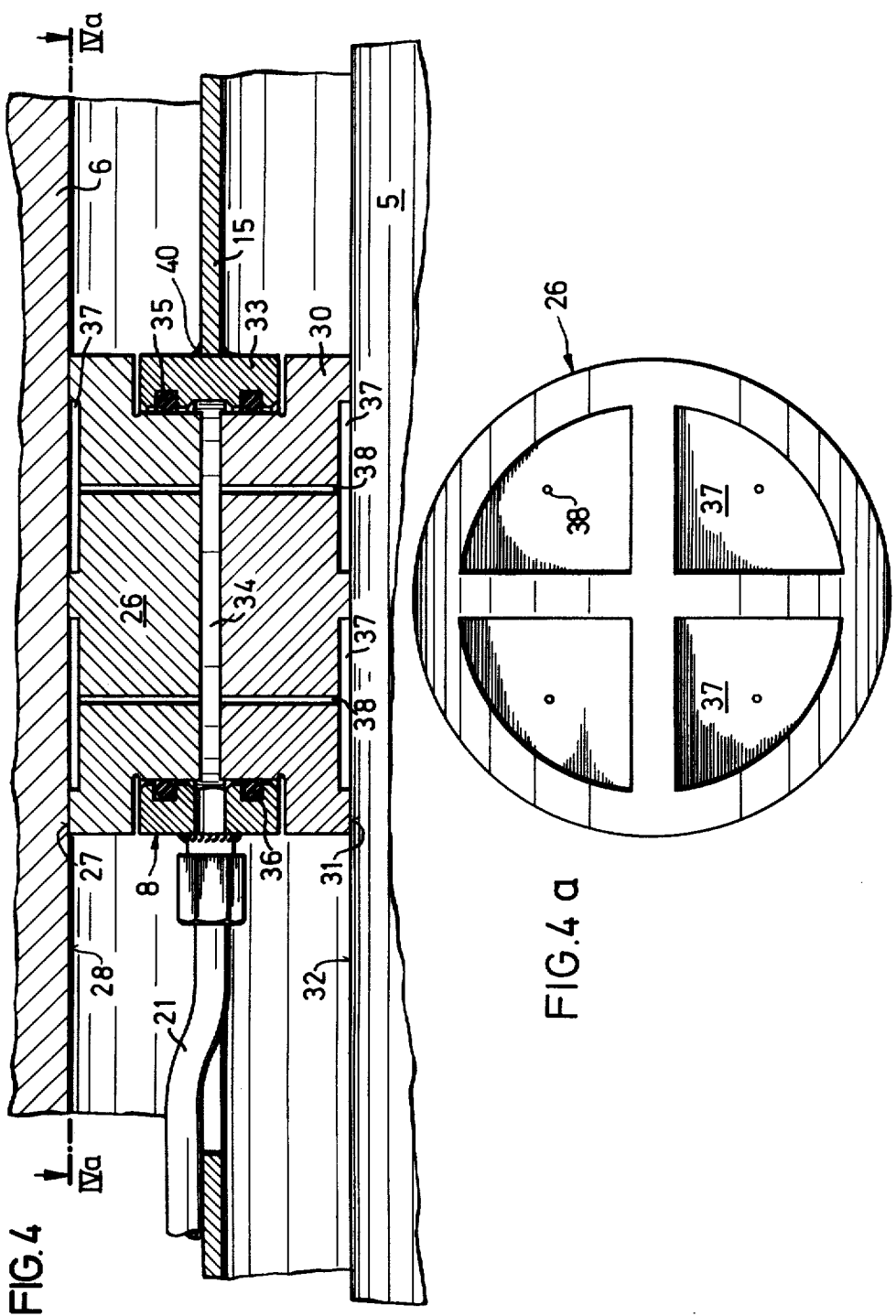

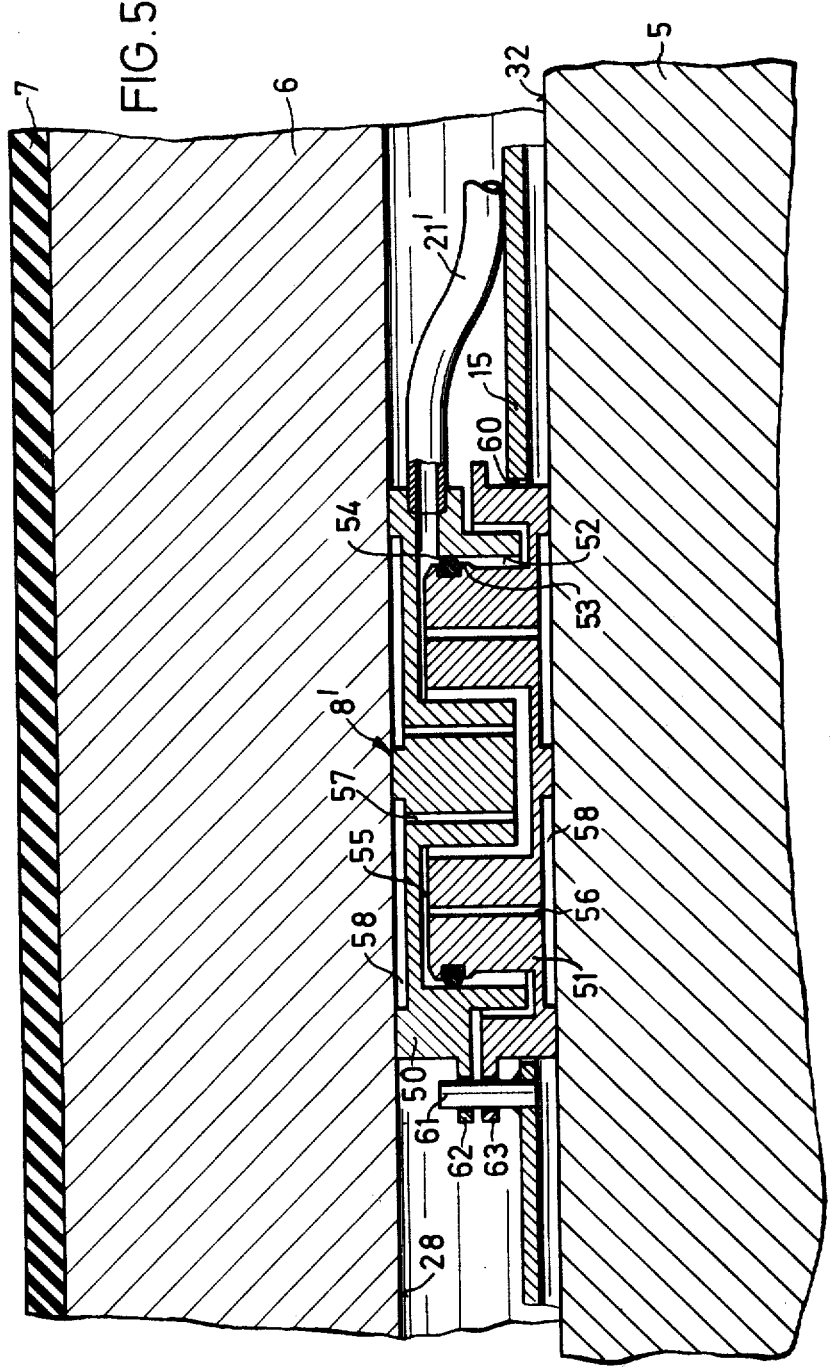

ROLL

The present invention pertains to controlled deflection rolls for such uses as the calendering of paper, and more particularly to such rolls having a stiff central core supported at its ends by bearings in fixed supports or piers and having a hollow cylindrical shell which is rotatably disposed about the core and is supported therefrom by at least one hydraulically actuated supporting element mounted in the core. In such controlled deflection rolls the shell provides the working surface of the roll, and the shell-supporting elements serve to hold the shell to cylindrical shape, especially along the working nip at which the roll engages a mating roll, in spite of bending of the core under the load imposed by the material being worked.

Such a roll is shown in Swiss Pat. No. 541,088. As disclosed in application Ser. No. 409,644, filed Oct. 25, 1973, now U.S. Pat. No. 3,885,283, the shell-supporting elements may also serve directly to supply the counter-force with which the roll is pressed against its mating roll in a set.

In these known constructions the shell-supporting elements take the form of pistons which are carried in radially extending cylinders formed in the core. The supply of fluid under pressure to the individual cylinders is effected through conduits in the core.

In such rolls the core must occupy a fixed angular position in order that the direction in which stress is exerted by the shell-supporting elements on the shell may remain fixed. When the roll is not a driven one, the core can be fixed at both ends against rotation in the piers or other framework of the roll set. When in contrast the roll is to be a driven one, additional difficulties arise. There can be employed a bearing arrangement of the kind disclosed in U.S. Pat. No. 3,703,862, in which the roll shell is borne at each end in bearings from the frame. The shell is extended at one end out beyond those bearings into a shaft to which driving torque can be applied, and is open at the other end. The core extends inside the roll shell over at least the working length of the roll and is supported from the shell at each end of that working length by bearings between it and the shell. In addition, the core extends, at the end of the roll opposite to that at which torque is applied to the shell, out beyond the open end of the shell to a point where it is fixed against rotation. This construction often entails a so-called three-ring bearing at each end of the roll. In such a bearing the innermost ring is fixed to and carries the core, the intermediate ring is fixed with respect to the roll shell and, at least at one end, transmits the driving torque to it, and the outermost ring is fixed to the frame and carries one end of the roll.

Such a construction is expensive and is subject to the disadvantage that it is not well-adapted to carrying large loads. The bearings must be given so large a diameter as to make difficult the accommodation of this roll with the mating roll in a set.

It is an object of the invention to provide a controlled deflection roll which is free of this disadvantage and which provides drive to the roll shell without recourse to the three-ring bearing construction.

In the roll of the invention the central core takes the form of a rotatable shaft which is coupled to the shell for torque transmission so that the two rotate together, and the core can itself be coupled to a source of drive torque. The shell-suppoorting element or elements include slippage surfaces at which those elements bear against the inner surface of the rotating roll shell and also against the outside surface of the rotating shaft, means being further provided to prevent rotation of the shell-supporting elements themselves about the axis of the roll.

Such a roll requires at its ends nothing more than bearings for the shaft, which constitutes the core subject to bending, since the roll shell is supported exclusively from the shaft. Since the shaft rotates with the shell, a simple coupling of the two together may be employed for the transmission of torque between them. The core, which may have substantially the shape of a cylindrical shaft, is of simple construction and need include neither radially extending cylinders for support of the shell-supporting pistons nor the axial channels for supply of hydraulic fluid to those cylinders. It can therefore be of extremely rigid nature.

The shell-supporting element or elements may include one piston pressing at a lubricated slippage surface thereof against the inner surface of the shell and a second piston pressing at a lubricated slippage surface thereof against the exterior surface of the shaft or core. In this way, the two pistons can be fitted to move in a common cylinder formed in a sleeve or other member extending axially between the core and shell and fixed against rotation about the roll axis by coupling to the stationary pier or framework for the roll at one end thereof. Alternatively the cylinder for receipt of one piston may be formed in the other piston. The first of these constructions for the shell-supporting elements is simple and robust. The other has the advantage of a particularly low height so as to be compatible with a small separation between the shaft and the roll shell.

Usually a plurality of hydraulic cylinder and piston shell-supporting elements are provided, disposed in one or more rows which extend parallel to the axis of the roll. It is also possible to employ a single such element having extension lengthwise of the axis, i.e., with a piston of non-circularly cylindrical shape.

Advantageously the carrier which holds the shell-supporting elements against rotation about the roll axis includes a cylindrical sleeve which is disposed in the annular space between the shaft and the roll shell and which is fixed to one of the end piers for the roll, i.e., to one of the bearings for the shaft. This produces a particularly strong construction as regards torsional stresses. The carrier need not however extend over 360° about the roll axis. This carrier may moreover be extended at one or both ends of the shaft into a guide which is rotatably supported from the roll shell and which permits motion of the shell radially with respect to the shaft.

BRIEF DESCRIPTION OF THE DRAWINGS

The invention will now be further described in terms of a number of presently preferred embodiments and with reference to the accompanying drawings in which:

FIGS. 2, 3 and 4 are sectional views taken on the lines II—II of FIG. 1, III—III of FIG. 1, and IV—IV of FIG. 3 respectively;

FIG. 4a is a radially inwardly developed sectional view taken on the line IVa—IVa of FIG. 4; and FIG. 5 is a sectional view similar to that of FIG. 1 but illustrating an alternative construction.

Referring to FIGS. 1 to 3, reference characters 1 and 2 identify two piers or feet constituting part of a stationary framework for the support of the roll shown. They carry in bearings 3 and 4 a rotatable shaft 5 which constitutes the core of the roll. These bearings are advantageously anti-friction bearings as shown. Functionally however, the bearings 3 and 4 may be regarded as stationary elements which support the ends of shaft 5, are fixed with respect to the piers 1 and 2, and permit the shaft to rotate with respect to those bearings. The shaft includes an extension 5' for the supply of the driving torque to the shaft. A roll shell 6 is disposed about the shaft 5 and may be provided with an elastic sleeve 7 of rubber or similar material, as is often done with rolls employed in the paper industry. Between the shell 6 and the shaft 5 are disposed hydraulic shell-supporting devices generally indicated at 8 and the construction of which is illustrated in FIG. 4. The shaft 5 and roll shell 6 are coupled for rotation together by means of a coupling generally indicated at 10 which includes toothed rings 11 and 13, each of which includes both inside and outside teeth. A sleeve or bushing 14 fixed to shaft 5 has a toothed or splined coupling to the inside teeth of ring 13, whose outside teeth have a similar coupling to the inside teeth of ring 11. The outside teeth of ring 11 engage similarly with inside teeth on a ring 12, fast to the roll shell 6. The coupling 10 entrains the shell for rotation with the shaft but permits limited motion of the shell transversely of the shaft, whose axis is indicated at A.

Figure 1:
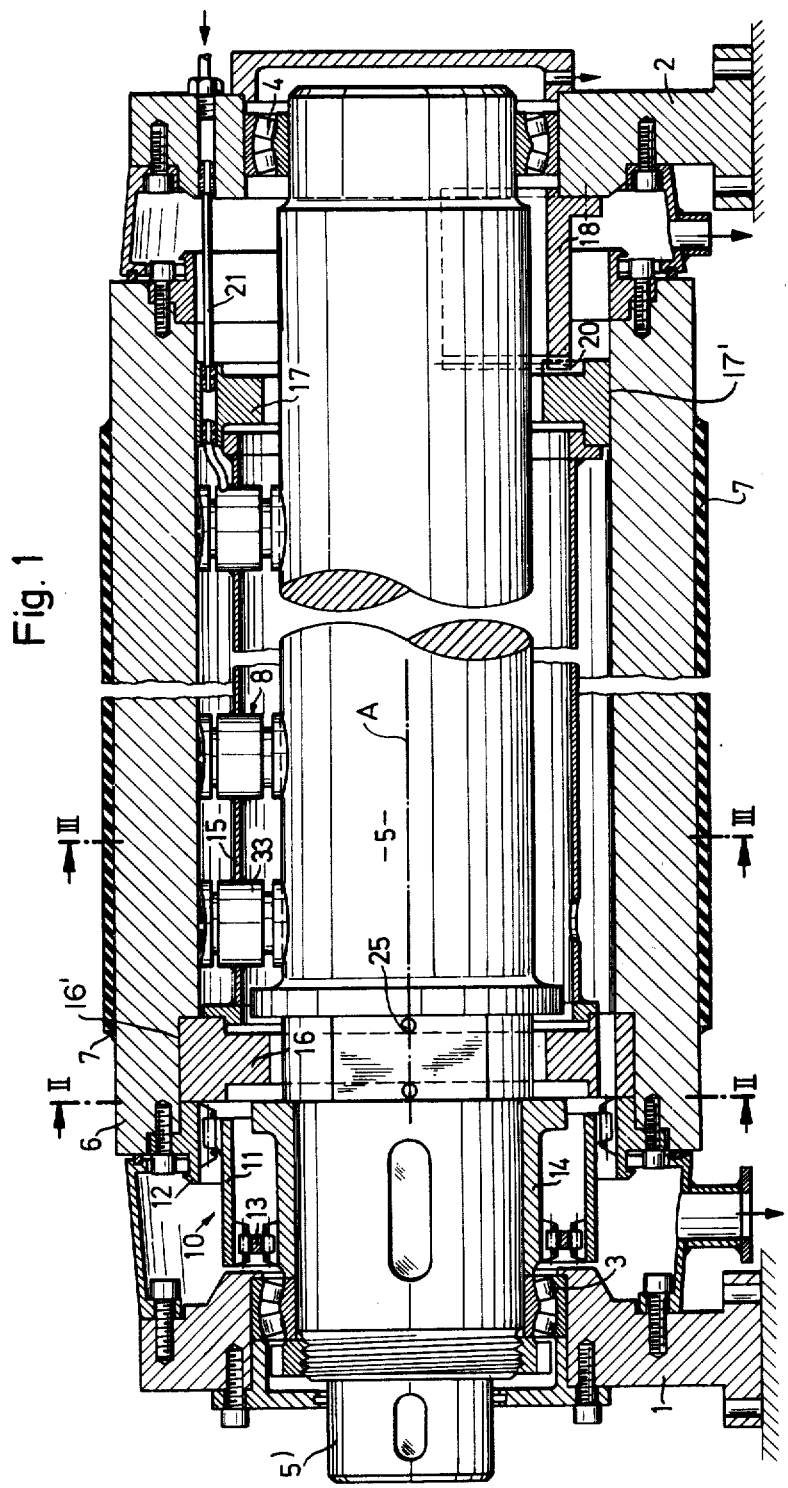
FIG. 1 is an axial section through a roll in accordance with the invention.

The hydraulic shell-supporting elements 8 are carried in a tubular sleeve 15 disposed in the annular space between the shaft 5 and the shell 6. The sleeve 15 is carried on, and is fastened to, guide rings 16 and 17 which have, with the shell 6, cylindrical bearing or slippage surfaces indicated at 16' and 17' in FIG. 1. The shell 6 can thus rotate with respect to the rings 16 and 17. The sleeve 15, and hence the rings 16 and 17, are prevented from rotating with the shaft and shell by means of an arcuate plate-shaped link 18. This link is fastened to the pier 2 and engages with the ring 17 at teeth 20. These teeth permit motion of the ring 17 in the plane of FIG. 1, i.e., in the plane containing the axis A of the roll (more exactly of the shaft 5) and passing through the supporting elements 8. These teeth also permit relative axial motion of the ring 17 and link 18 such as may be occasioned by thermal expansions or contractions.

The hydraulic supporting elements 8 are connected by a conduit or conduits 21 to a source of hydraulic fluid such as oil under pressure, not shown. The individual elements 8 are preferably connected to this source by separate conduits although only a single conduit 21 is shown in the drawing. They may however be connected to a common conduit.

The roll of FIG. 1 is intended to cooperate with an adjacent, mating roll, not shown, against which the shell 6 is pressed by the elements 8. The mating roll is mounted so that its axis and the axis A of the shaft 5 shown will lie in a plane passing through the shell-supporting elements 8. This is the section plans of FIG. 1.

Figure 2:
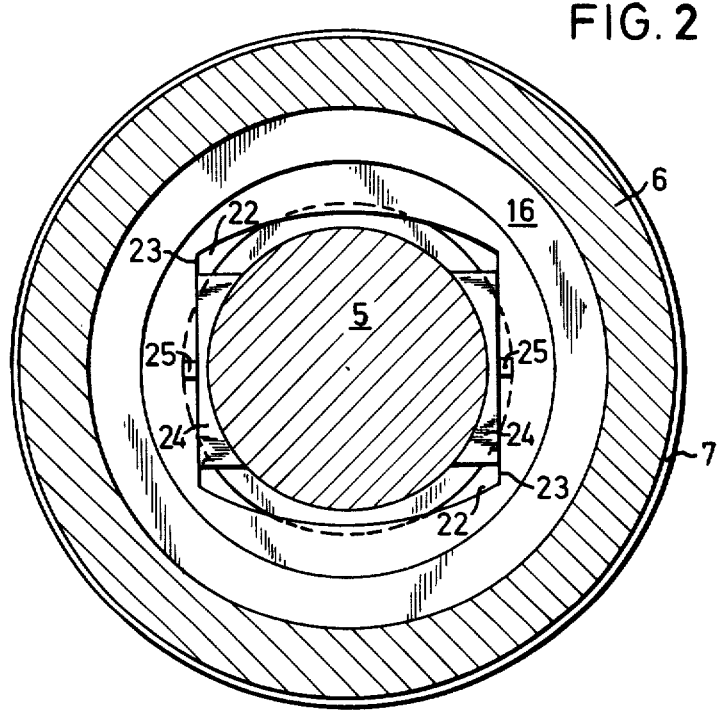
Figure 3:
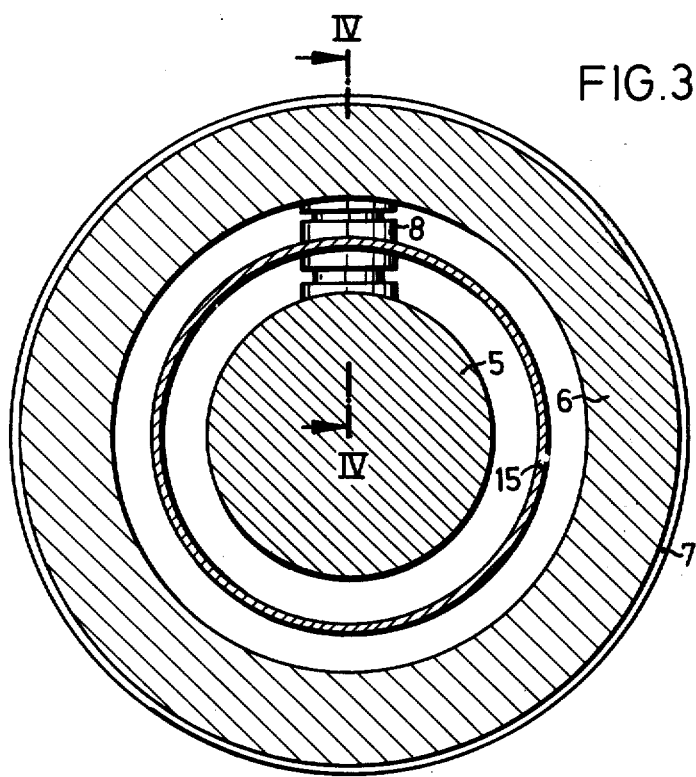

As may be seen from FIG. 2, the guide ring 16 is provided (as is also the ring 17) with an opening 22 having parallel flat side faces 23 which extend parallel to the plane just described, i.e., that containing the roll axis A and passing through, i.e., bisecting, the elements 8. Shoes 24 are provided having flat faces which engage the faces 23 and which have cylindrical faces engaging the shaft 5. Pins 25 extend radially outward from the shoes 24 and engage in vertical slots, not shown, in the rings 16 and 17. These pins hold the shoes 24 in engagement with the flat faces 23 of the rings 16 and 17, permitting however the shoes to rotate slightly with respect to those rings upon bending of the shaft 5.

The guide surfaces 23 extend as above indicated parallel to the working direction of the roll, i.e., to the plane containing the roll axis A, passing through the supporting elements 8 and containing the axis of the mating roll. Accordingly they permit the shell 6 together with the guide rings 16 and 17 to move bodily in that plane under the influence of the shifting balance of forces between the material being worked and the forces exerted on the roll shell by the supporting elements 8.

FIG. 4 shows one construction for the shell-supporting elements 8. Each such element includes a piston 26 which bears at a running surface 27 against the inner surface of roll shell 6. The supporting element further includes a piston 30 which bears at a running surface 31 against the exterior surface 32 of the shaft 5. The pistons 26 and 30 are supported in a common housing or cylinder block 33, made fast to the sleeve 15 as by welding at 40 and including a cyclindrical cavity 34 for the two pistons. While the cavity 34 can be regarded as a single cylinder, it can also be regarded as two coaxial cylinders, each accommodating one of the pistons 26 and 30. The portion of the cavity 34 between the pistons is coupled by a conduit 21 which leads to a source of hydraulic fluid under pressure.

Packing rings 35 and 36 are provided to seal the pistons 26 and 30 to the housing 33, enough play being allowed so that the piston may rotate slightly, as shaft 5 bends, to retain good contact with the shaft.

The pistons are provided at their outer ends with cavities 37 leading through suitably calibrated narrow throttling bores to the space 34 so as to form hydrostatic bearings of the type described, for example, in U.S. Pat. No. 3,802,044.

FIG. 5 illustrates an alternative form of construction for the shell-supporting elements. The embodiment of FIG. 5 has the advantage that it requires only a small clearance between the shaft and the roll shell. The shaft 5 can thus be made large and rigid for a given outer diameter of the shell.

The hydrostatic element 8' of FIG. 5 includes pistons 50 and 51, the piston 51 being however supported within a cylindrical cavity 52 formed in the piston 50 itself. The piston 51 is provided with a circular enlargement which carries a packing 54 to seal the piston to the walls of the cavity 52. The portion 55 of the cavity 52 behind the packing, i.e., between the pistons 50 and 51, connects via throttling passages 56 and 57 with hydrostatic lubricating cavities 58 in the pistons 50 and 51. In addition the cylindrical space 55 is connected via a conduit 21' with a source of hydraulic fluid under pressure, not shown.

In contrast to the shell-supporting element 8 of FIG. 4, the element 8' of FIG. 5 is loosely supported in the carrier sleeve or member 15. As shown in FIG. 5, the piston 51 is disposed with clearance in an opening 60 of the sleeve 15. In order to prevent rotation of the pistons 50 and 51 with respect to the sleeve 15, the latter is provided with a pin 61 which engage eyes formed in extensions 62 and 63 of the pistons.

Thus the invention provides a roll comprising a shaft such as the shaft 5, bearings such as the bearings 3 and 4 supporting the shaft for rotation, a rool shell such as the shell 6 surrounding the shaft with clearance, means such as the toothed rings 11 and 13 coupling the shell to the shaft for rotation therewith, carrier means such as the sleeve 15 disposed in that clearance and coupled to one of those bearings for restraint of the carrier means against rotation, and hydraulically operated means such as the elements 8 disposed in those carrier means to exert a stress between the shaft and shell. Preferably the hydraulically operated means to exert a stress between the shaft and shell include at least one piston such as the piston 26 of FIG. 4 having a bearing surface adapted to bear against the inner surface of the shell and at least one piston such as the piston 30 having a bearing surface adapted to bear against the outer surface of the shaft. These bearing surfaces are desirably hydrostatically lubricated. The pistons to which they belong may move in cylinders such as those indicated at 34 in FIG. 4. Alternatively the hydrostatically operated means to exert a stress between the shaft and shell may include two pistons working one within the other such as the pistons 50 and 51 in FIG. 5. According to another feature of the invention, the roll includes guide means such as the rings 16 and 17 which are rotatably coupled to the shell, i.e., coupled to the shell for rotation with respect thereto as at the slippage surfaces 16' and 17' in FIG. 1, these guide rings being moreover coupled to the shaft for linear motion transversely of the axis of the shaft, for example by means of the shoes 24 of FIG. 2.

While the invention has been described hereinabove in terms of a number of presently preferred embodiments thereof, the invention itself is not limited thereto but rather comprehends all modifications of and departures from those embodiments properly falling within the spirit and scope of the appended claims.

We claim:

1. A roll comprising a shaft, bearings supporting the shaft for rotation, a roll shell surrounding the shaft with clearance, means coupling the shell to the shaft for rotation therewith, carrier means disposed in said clearance and coupled to one of said bearings for restraint against rotation, and hydraulically operated means disposed in said carrier means to exert a stress between said shaft and shell.

2. A roll according to claim 1 wherein said hydraulically operated means includes at least one piston having a bearing surface adapted to bear against the inner surface of said shell and at least one piston having a bearing surface adapted to bear against the outer surface of said shaft.

3. A roll according to claim 2 wherein said pistons move in cylinders formed in said carrier means.

4. A roll according to claim 1 wherein said hydraulically operated means include two pistons working one within the other.

5. A roll according to claim 1 wherein said bearing surfaces are hydrostatically lubricated.

6. A roll according to claim 1 including a plurality of hydraulically operated means to exert a stress between said shaft and shell, said plural means being disposed in said carrier in at least one row extending substantially parallel to the axis of the shaft.

7. A roll according to claim 1 wherein said carrier means are annular.

8. A roll according to claim 1 further including guide means affixed to said carrier means, said guide means being rotatably coupled to said shell and being coupled to said shaft for linear motion transversely of the axis of said shaft.

* * * * *